(12) United States Patent
Langenfeld et al.

(10) Patent No.: US 11,980,197 B2
(45) Date of Patent: May 14, 2024

(54) ROLLED FOOD PRODUCT AND METHOD OF PRODUCING

(71) Applicant: General Mills, Inc., Minneapolis, MN (US)

(72) Inventors: Roberta M. Langenfeld, Minnetonka, MN (US); Anna Gale, Plymouth, MN (US); Benjamin R. Heyda, Shakopee, MN (US); Craig E. Gustafson, Bloomington, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 18/077,347

(22) Filed: Dec. 8, 2022

(65) Prior Publication Data

US 2023/0104327 A1     Apr. 6, 2023

Related U.S. Application Data

(62) Division of application No. 15/694,126, filed on Sep. 1, 2017, now Pat. No. 11,540,522.

(51) Int. Cl.
| | |
|---|---|
| *A21D 13/30* | (2017.01) |
| *A21C 3/10* | (2006.01) |
| *A21C 5/00* | (2006.01) |
| *A21C 9/00* | (2006.01) |
| *A21C 9/06* | (2006.01) |
| *A21C 11/10* | (2006.01) |
| *A21D 13/40* | (2017.01) |

(52) U.S. Cl.
CPC ............... *A21D 13/30* (2017.01); *A21C 3/10* (2013.01); *A21C 5/00* (2013.01); *A21C 9/00* (2013.01); *A21C 9/061* (2013.01); *A21C 11/10* (2013.01); *A21D 13/40* (2017.01)

(58) Field of Classification Search
CPC ........... A21D 13/30; A21D 13/40; A21C 9/00
See application file for complete search history.

(56) References Cited

U.S. PATENT DOCUMENTS

| | | |
|---|---|---|
| 3,603,268 A | 9/1971 | Wietzel |
| 4,526,795 A | 7/1985 | Wolf |
| 6,227,087 B1 | 5/2001 | Thorson et al. |

OTHER PUBLICATIONS

How to Shape Crescent Rolls, http://www.melandboyskitchen.com/2013/02/04.to-shape-crescent-rolls. Feb. 4, 2013.

*Primary Examiner* — Katherine D Leblanc
(74) *Attorney, Agent, or Firm* — Diederiks & Whitelaw, PLC; John L. Crimmins, Esq.

(57) ABSTRACT

Rolled food products are produced by cutting a dough sheet to form a roll sheet having a continuous pattern. The pattern is comprised of an asymmetrical repeat unit. The roll sheet is transported in a first direction with a conveyor system, and the roll sheet is rolled in a second direction to form a continuous roll. The second direction is not parallel to the first direction. The continuous roll is cut to form a plurality of rolls. Each of the plurality of rolls is asymmetrical.

20 Claims, 4 Drawing Sheets

ROLLED FOOD PRODUCT AND METHOD OF PRODUCING

CROSS-REFERENCE TO RELATED APPLICATIONS

This application represents a divisional application of U.S. patent application Ser. No. 15/694,126 entitled "Rolled Food Product and Method of Producing" filed Sep. 1, 2017, pending. The entire content of this application is incorporated herein by reference.

BACKGROUND OF THE INVENTION

The present invention pertains to rolled food products and, more particularly, to rapidly producing rolled food products in a cost-efficient manner.

A variety of rolled food products (i.e., rolls) are known in the art. Crescent rolls and cinnamon rolls represent two popular options. When producing rolls on a commercial scale, the dough that forms the rolls is generally rolled by machinery as the dough is transported along a conveyor system. Specifically, for crescent rolls, the dough is typically rolled in a direction parallel to the direction in which the dough is traveling. This results in the longitudinal axis of each roll being perpendicular to the direction of travel. Depending on the subsequent machinery being used, the rolls may need to be rotated 90 degrees, which adds cost and complexity to the production process. Accordingly, there is a need in the art for a way to roll dough where the longitudinal axes of the resulting rolls are parallel to the direction in which the rolls are traveling.

SUMMARY OF THE INVENTION

The present invention is directed to rolled food products and a method of producing rolled food products. A dough sheet is cut to form a roll sheet having a continuous, asymmetrical repeating pattern. The roll sheet is transported in a first direction with a conveyor system, and the roll sheet is rolled in a second direction, which is not parallel to the first direction, forming a continuous roll. The continuous roll is cut to form a plurality of rolls. Each of the plurality of rolls is asymmetrical. Also, each of the plurality of rolls has a first amount of dough on a first side of a central transverse plane and a second, different amount of dough on a second, opposite side of the central transverse plane. Preferably, the first amount of dough is 42.5-47.5% of the total amount of dough, while the second amount of dough is 52.5-57.5% of the total amount dough.

In one embodiment, each of the plurality of rolls is formed from a dough piece including a bottom edge, a first top edge and a second top edge. The first and second top edges are directly connected at a peak that is not centered relative to the bottom edge. Also, the first top edge is at a first angle relative to the bottom edge, and the second top edge is at a second, different angle relative to the bottom edge.

The dough piece also includes a first side edge, a second side edge and a transition area. The first side edge connects the bottom edge to the first top edge, and the second side edge connects the bottom edge to the transition area. The transition area connects the second side edge to the second top edge. The first top edge is directly connected to the first side edge at a first point, and the second top edge is directly connected to the transition area at a second point. The second direction is perpendicular to a line drawn through the first and second points.

In one embodiment, an angle formed between the first direction and the second direction is 75-80 degrees. Also, the roll sheet is rolled with a torpedo roller having a contact face. An angle formed between the first direction and the contact face is 165-170 degrees. The roll sheet is rolled so that a longitudinal axis of the continuous roll is parallel to the first direction.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, any numerical value listed herein modified by the word "about" includes a margin of error of +/−10%. Accordingly, a length of "about 1.0 centimeter" includes lengths between 0.90 and 1.1 centimeters. Similarly, a range of 8.00-12.0 centimeters includes lengths between 7.20 and 13.2 centimeters. The terms "parallel" and "perpendicular" are defined as including a margin of error of +/−5° such that two objects need not be perfectly parallel, for example.

As discussed above, when producing crescent rolls, it is sometimes necessary to rotate the rolls after rolling because of how the downstream production machinery is configured. This adds cost and complexity to the production process. Although it may be possible to reconfigure the downstream production machinery in such a situation, this is not always convenient or economical. To address this issue, the present invention provides a way to roll the dough such that the resulting rolls are aligned in the desired direction without the need for rotation. Specifically, unlike other roll production methods, the dough of the present invention is not rolled in a direction parallel to the direction in which the dough is traveling, which would result in the longitudinal axes of the rolls being aligned perpendicular to the direction of travel. Instead, the dough of the present invention is rolled in such a way that the longitudinal axes of the resulting rolls are aligned parallel to the direction in which the rolls are traveling.

Figure 1:
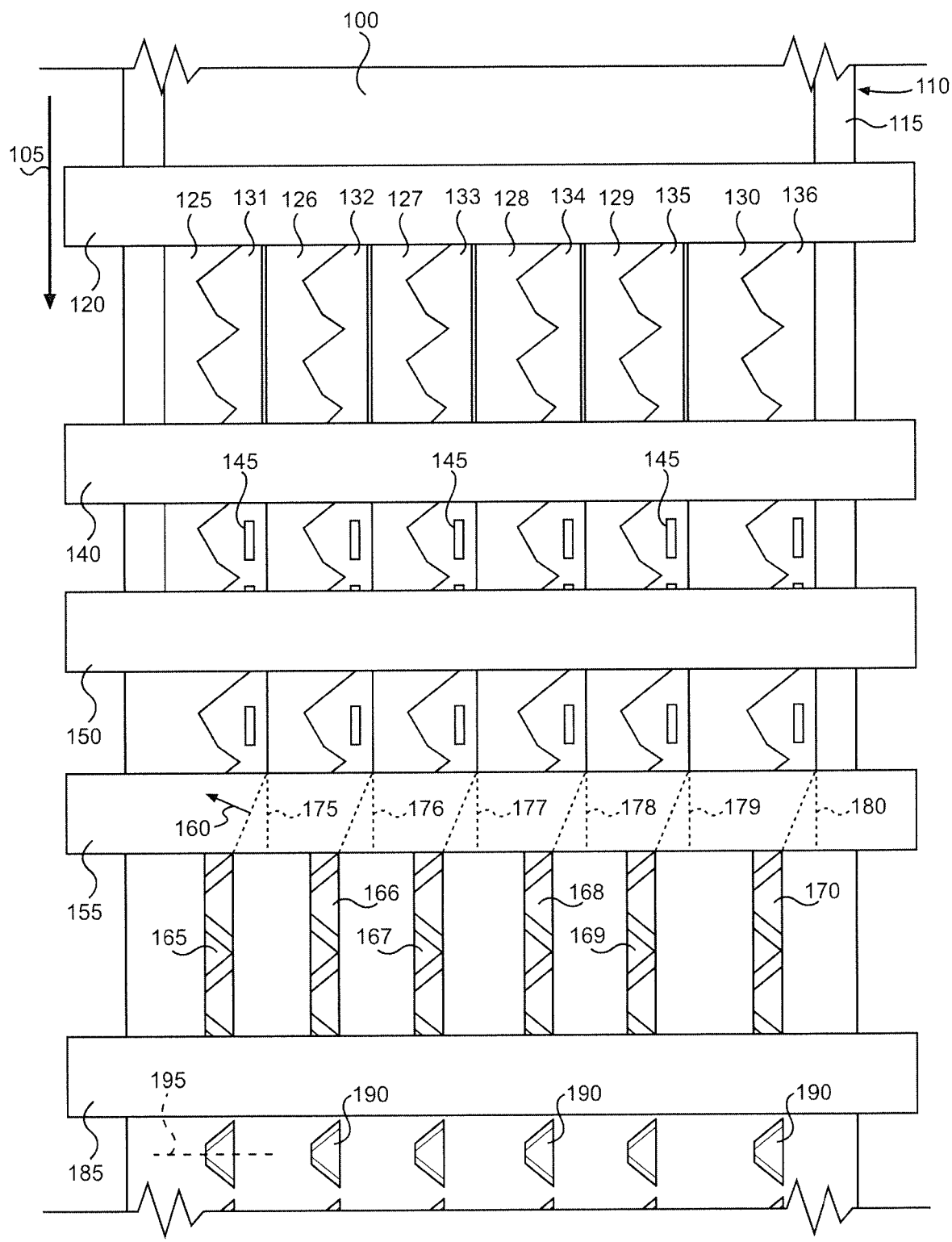
FIG. 1 is a schematic view of machinery used to produce rolls in accordance with the present invention.

FIG. 1 provides a schematic overview of the machinery used to produce crescent rolls in accordance with the present invention. In particular, FIG. 1 shows a dough sheet 100 being transported in a direction 105 by a conveyor system 110. In the embodiment illustrated, conveyor system 110 includes a conveyor belt 115 on which dough sheet 100 is supported. However, other conveyor systems known in the art can be used with the present invention.

Dough sheet 100 first passes under or through a dough cutter 120. Dough cutter 120 is configured to continuously cut a pattern into dough sheet 100 as dough sheet 100 is transported in direction 105. This pattern is important to the present invention, as will become clear below. To cut the pattern into dough sheet 100, dough cutter 120 is typically provided with a roller having a plurality of blades (not shown), which form the pattern in dough sheet 100 as the roller rotates. Although the pattern is discussed in more detail in connection with FIG. 2, it can be seen that dough sheet 100 is now divided into a plurality of sheets 125-136, alternating between extra sheets 125-130 and roll sheets 131-136. Extra sheets 125-130 represent extra dough, while roll sheets 131-136 eventually become crescent rolls. In one exemplary embodiment, each peak of roll sheets 131-136 is located about 0.500 inches (1.270 cm) from the left edge of the extra sheet 125-130 immediately to the left of that roll sheet 131-136 (relative to FIG. 1). Also, each pair of extra sheets 125-130 and roll sheets 131-136 is about 6.569 inches (16.69 cm) wide. That is, the combined width of extra sheet 126 and roll sheet 132, for example, is about 6.569 inches (16.69 cm).

If filled crescent rolls are desired, sheets 125-136 are transported under or through a depositor 140. Depositor 140 is configured to deposit a filling 145 on each of roll sheets 131-136. A variety of different fillings can be used for filling 145, including chocolate or a jam, for example. In one exemplary embodiment, each deposit of filling 145 extends about 2.125-2.500 inches (5.398-6.350 cm) along the length of the corresponding roll sheet 131-136.

Sheets 125-136 are also transported through or past a dough remover 150, which is configured to remove extra sheets 125-130 from conveyor belt 115 since extra sheets 125-130 are not needed and would interfere with later production steps. Although dough remover 150 is shown as being located after depositor 140 in FIG. 1, this arrangement can be reversed such that extra sheets 125-130 are removed by dough remover 150 prior to filling 145 being deposited on roll sheets 131-136.

After extra sheets 125-130 are removed and, optionally, filling 145 is deposited, roll sheets 131-136 are transported through a rolling machine 155. Rolling machine 155 is configured to roll sheets 131-136 in a direction 160 to form a plurality of continuous crescent rolls 165-170. Specifically, this is accomplished using a plurality of torpedo rollers 175-180. Unlike typical crescent roll production methods, direction 160 is not parallel to the direction in which roll sheets 131-136 are traveling. In combination with the use of torpedo rollers 175-180, this results in continuous crescent rolls 165-170 being aligned parallel to the direction of travel rather than perpendicular to the direction of travel. Accordingly, no separate machinery is needed to rotate continuous crescent rolls 165-170 in situations where this alignment is desired.

Next, continuous crescent rolls 165-170 are transported under or through a cutter 185, which is configured to cut continuous crescent rolls 165-170 into a plurality of discrete crescent rolls 190. To accomplish this, cutter 185 is provided with one or more blades (not shown) oriented perpendicular to the direction in which continuous crescent rolls 165-170 are traveling. Preferably, cutter 185 is a timed guillotine cutter. Due to the shape of roll sheets 131-136 and the angled rolling performed by torpedo rollers 175-180, each of crescent rolls 190 has a different amount of dough at each end while still retaining a symmetrical outer appearance. That is, if a given crescent roll 190 were divided along a central transverse plane (e.g., a plane 195), a different amount of dough would be located on each side of the plane. In one exemplary embodiment, 42.5-47.5% of the dough is located above plane 195 and 52.5-57.5% of the dough is located below plane 195 (relative to FIG. 1).

While further production steps would typically occur after cutting, e.g., proofing, baking and packaging, these steps are not the focus of the present invention and are therefore not shown. Similarly, it should be recognized that a variety of steps are performed to prepare dough sheet 100. Again, such steps are not the focus of the present invention and are not shown.

Figure 2:
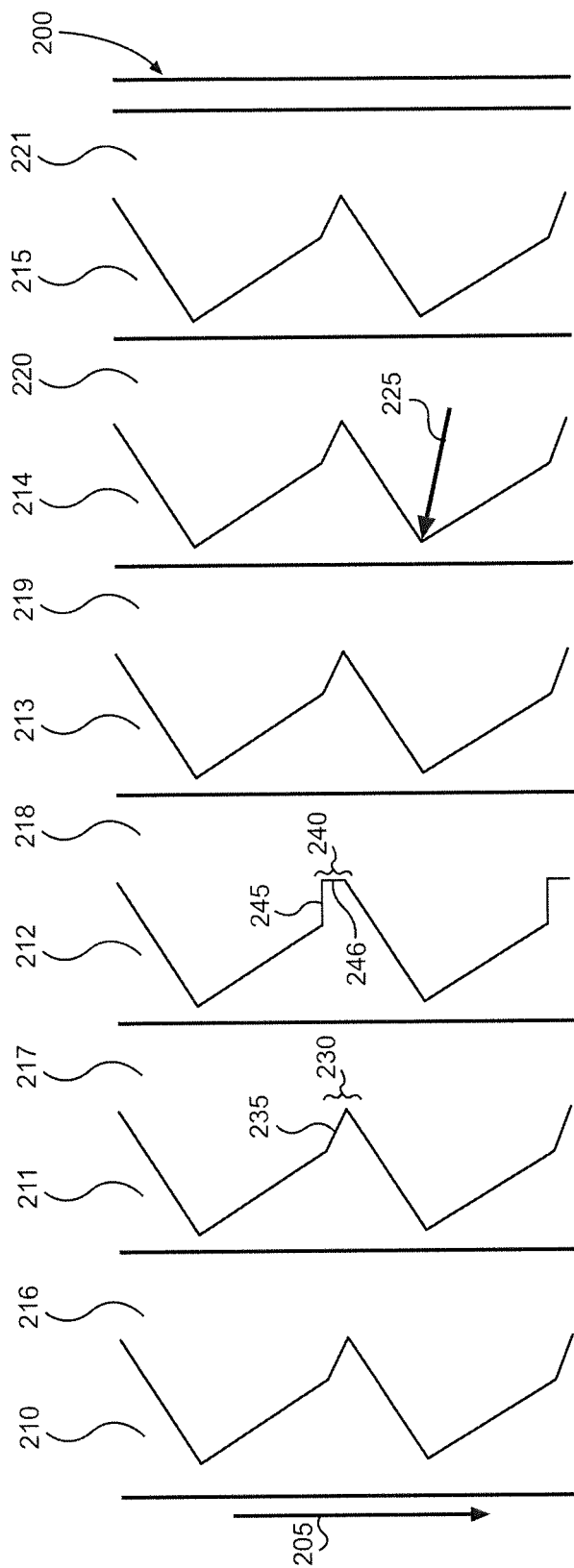
FIG. 2 shows a pattern cut into the dough during production of the rolls.

With reference now to FIG. 2, a dough sheet 200 is shown traveling in a direction 205. FIG. 2 illustrates two different patterns that can be continuously cut into dough sheet 200 by a dough cutter (e.g., dough cutter 120 in the form of a roller) in accordance with the present invention. The pattern of the first embodiment matches the pattern cut into dough sheet 100 by dough cutter 120 in FIG. 1. This pattern divides dough sheet 200 into extra sheets 210, 211 and 213-215 and roll sheets 216, 217 and 219-221. The pattern of the second embodiment divides dough sheet 200 into an extra sheet 212 and a roll sheet 218. Roll sheets 216-221 are rolled in a direction 225 to form continuous crescent rolls.

The difference between the patterns relates to the transition areas between each roll, i.e., the areas where the resulting continuous crescent rolls are cut to form discrete rolls. One of the transition areas for the first embodiment is indicated at 230. Transition area 230 includes a single angled line segment 235. The transition area for the second embodiment is labeled 240. Transition area 240 includes two line segments 245 and 246. Line segment 245 is perpendicular to direction 205, while line segment 246 is parallel to direction 205. Transition areas 230 and 240 provide more leeway for cutting the continuous crescent rolls without affecting the shape of the resulting discrete rolls.

Figure 3:
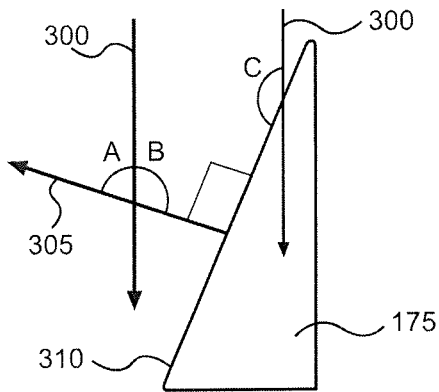
FIG. 3 shows the direction in which the dough is rolled relative to the direction in which the dough is traveling.

FIG. 3 shows the direction in which a dough sheet (e.g., roll sheet 131 from FIG. 1) is rolled relative to the direction in which the dough sheet is traveling. Specifically, a direction 300 corresponds to the direction in which the dough sheet is traveling, and a direction 305 corresponds to the direction in which the dough sheet is rolled. FIG. 3 also shows torpedo roller 175, which has a contact face 310. Direction 305 is perpendicular to contact face 310 and is therefore determined by the angle of contact face 310 relative to direction 300. As discussed above, direction 305 is not parallel to direction 300, as is typical in the art of torpedo rollers. Instead, the angle formed between direction 300 and direction 305 is preferably 75-80 degrees. For purposes of the present invention, this angle corresponds to an angle A shown in FIG. 3. An angle B is also formed, with angles A and B being supplementary (i.e., the sum of angles A and B is 180 degrees). Accordingly, angle B is preferably 100-105 degrees. For the angle formed between direction 300 and direction 305 (i.e., angle A) to be 75-80 degrees, the angle formed between contact face 310 and direction 300 must be 165-170 degrees. For purposes of the present invention, this angle corresponds to an angle C shown in FIG. 3. For simplicity, only torpedo roller 175 has been discussed. However, torpedo rollers 176-180 are preferably arranged in an identical manner.

Figure 4:
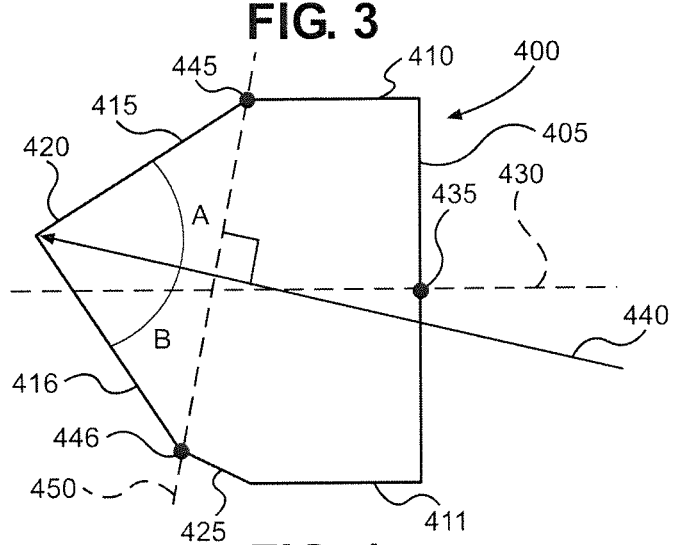
FIG. 4 shows how the dough of a roll of a first embodiment of the present invention would look if the roll were unrolled.

FIG. 4 shows how the dough of a roll cut using the pattern of the first embodiment would look if the roll were unrolled. In other words, FIG. 4 shows how discrete crescent rolls 190 from FIG. 1 would look when unrolled. The dough generally has the shape of a house with a pitched roof. Specifically, a dough piece 400 includes a bottom edge 405, two side edges 410 and 411 directly connected to bottom edge 405 and two angled top edges 415 and 416 directly connected at a peak 420. Dough piece 400 also includes a transition area 425 (discussed above in connection with FIG. 2) that connects side edge 411 to top edge 416. For purposes of illustration, a line 430 is drawn through a center point 435 of bottom edge 405, with line 430 being perpendicular to bottom edge 405. Line 430 helps emphasize the asymmetry of dough piece 400 and, particularly, that peak 420 is not centered relative to bottom edge 405. It can also be seen that different amounts of dough are located on each side of line 430 and that top edges 415 and 416 are at different angles relative to bottom edge 405. Dough piece 400 is shaped this way to compensate for the fact that, in the present invention, dough sheets are rolled at an angle relative to the direction in which the dough sheets are traveling. Specifically, dough piece 400 would have been rolled in a direction 440 prior to being cut. If dough piece 400 were symmetrical and rolled in direction 440, the resulting roll would have an asymmetrical outer appearance. To produce a roll having a symmetrical outer appearance in this scenario, dough piece 400 must be asymmetrical. Specifically, top edges 415 and 416 are arranged so that, when direction 440 is drawn through peak 420, an angle A formed between direction 440 and top edge 415 is equal to an angle B formed between direction 440 and top edge 416. Also, a point 445 where top edge 415 meets side edge 410 and a point 446 where top edge 416 meets transition area 425 are located in specific positions relative to direction 440. This relationship is best understood in connection with a line 450, which is included for illustration purposes and drawn to intersect points 445 and 446. Points 445 and 446 are located such that direction 440 is perpendicular to line 450.

Although the discussion of dough piece 400 focuses on the shape of dough piece 400 itself, it should be recognized that this shape results from the specific configuration of dough cutter 120 and cutter 185, for example. That is, the shape of dough piece 400 is determined by the pattern continuously cut into dough sheet 100 by dough cutter 120 in combination with the additional cutting performed by cutter 185.

Figure 5:
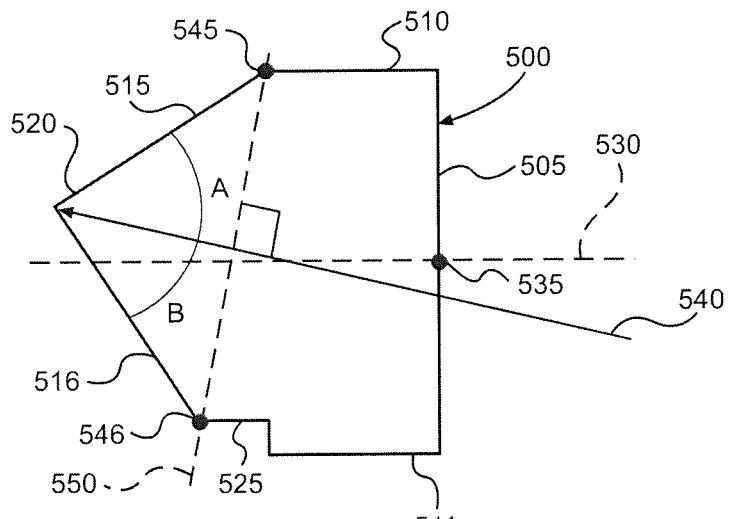
FIG. 5 shows how the dough of a roll of a second embodiment of the present invention would look if the roll were unrolled.

Turning to FIG. 5, FIG. 5 shows how the dough of a roll cut using the pattern of the second embodiment would look if the roll were unrolled. In other words, FIG. 5 shows how a roll formed from roll sheet 218 of FIG. 2 would look when unrolled. As with dough piece 400, the dough shown in FIG. 5 generally has the shape of a house with a pitched roof. Specifically, a dough piece 500 includes a bottom edge 505, two side edges 510 and 511 directly connected to bottom edge 505 and two angled top edges 515 and 516 directly connected at a peak 520. Dough piece 500 also includes a transition area 525 (discussed above in connection with FIG. 2) that connects side edge 511 to top edge 516. For purposes of illustration, a line 530 is drawn through a center point 535 of bottom edge 505, with line 530 being perpendicular to bottom edge 505. Line 530 helps emphasize the asymmetry of dough piece 500 and, particularly, that peak 520 is not centered relative to bottom edge 505. It can also be seen that different amounts of dough are located on each side of line 530 and that top edges 515 and 516 are at different angles relative to bottom edge 505. In general then, dough piece 500 is the same as dough piece 400 except for the differences between transition areas 425 and 525. Like dough piece 400, dough piece 500 is shaped this way to compensate for the fact that, in the present invention, the dough sheets are rolled at an angle relative to the direction in which the dough sheets are traveling. Specifically, dough piece 500 would have been rolled in a direction 540 prior to being cut. To account for this, top edges 515 and 516 are arranged so that, when direction 540 is drawn through peak 520, an angle A formed between direction 540 and top edge 515 is equal to an angle B formed between direction 540 and top edge 516. Also, a point 545 where top edge 515 meets side edge 510 and a point 546 where top edge 516 meets transition area 525 are located in specific positions relative to direction 540. This relationship is best understood in connection with a line 550, which is included for illustration purposes and drawn to intersect points 545 and 546. Points 545 and 546 are located such that direction 540 is perpendicular to line 550.

Although FIGS. 4 and 5 have been described as showing how the dough of a roll of the present invention would look after being unrolled, it should be noted that the shapes shown in FIGS. 4 and 5 also correspond to the repeat unit of the pattern cut by a dough cutter of the present invention. For example, roll sheet 131 of FIG. 1 is essentially made up of a repeating chain of dough pieces shaped like dough piece 400. Accordingly, the description of dough piece 400 also accurately describes the repeat unit of roll sheet 131, e.g., the peak of the repeat unit is not centered relative to the bottom edge of the repeat unit.

Figure 6:
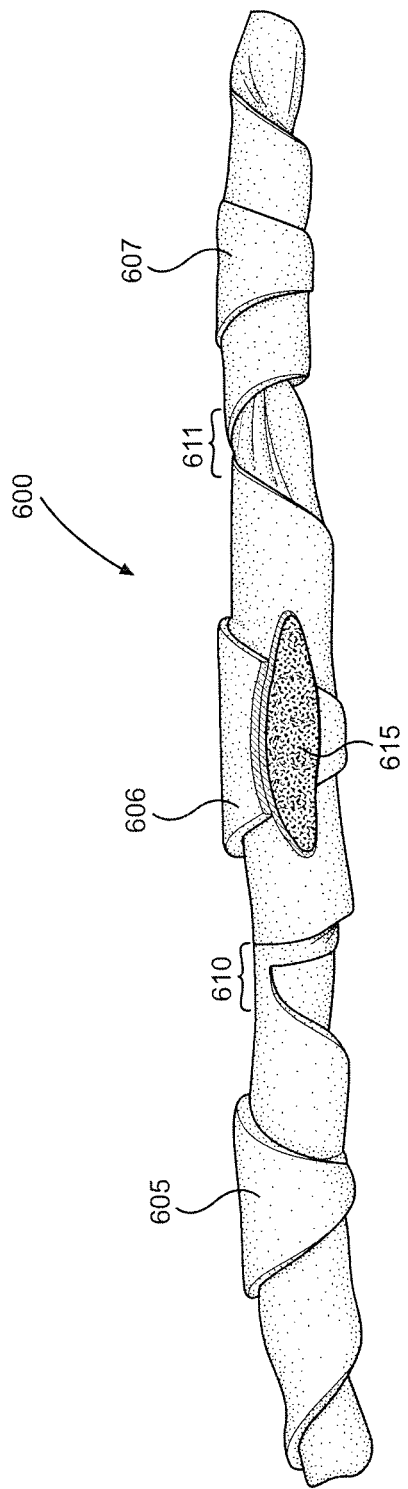
FIG. 6 is a perspective view of a continuous crescent roll produced in accordance with the present invention.

With reference now to FIG. 6, there is shown a continuous crescent roll 600 produced in accordance with the present invention. For illustration purposes, continuous crescent roll 600 is shown separate from the roll sheet to which continuous crescent roll 600 would typically be connected at this point in the production process. Continuous crescent roll 600 is made up of three crescent rolls 605-607, which are joined by transition areas 610 and 611. Transition areas 610 and 611 provide more leeway for cutting continuous crescent roll 600 without affecting the shape of the resulting discrete crescent rolls (i.e., crescent rolls 605-607). Also, a portion of crescent roll 606 has been removed to show a filling 615. Filling 615 can take the form of a chocolate or jam, for example.

The dough of the crescent rolls of the present invention has been described as asymmetrical. In contrast, prior art crescent rolls are considered to be symmetrical. For purposes of the present invention, these terms refer to the intended dough shape recognizing that, due to imperfections inherent in the associated production processes, crescent rolls will frequently not match their intended shape. In other words, crescent rolls intended to be symmetrical are considered symmetrical even though some of these crescent rolls will likely be not perfectly symmetrical in practice. This also applies to other aspects of the dough shape. For example, by the peak being off-center relative to the bottom edge or more dough being present on one side of the central transverse plane than the other, it is meant that these features are intentionally present rather than being present due to imperfect cutting, and make the current rolls asymmetrical. Generally, when a prior art roll is divided along its centerline, the roll can have up to a 2% difference in the amount of dough on each side of the centerline (e.g., 49% on one side and 51% on the other). In contrast, rolls of the present invention preferably have a 5-15% difference in the amount of dough on each side of the centerline (e.g., 42.5-47.5% on one side and 52.5-57.5% on the other).

Based on the above, it should be readily apparent that the present invention provides a way to roll dough where the longitudinal axes of the resulting rolls are parallel to the direction in which the rolls are traveling. While certain preferred embodiments of the present invention have been set forth, it should be understood that various changes or modifications could be made without departing from the spirit of the present invention. In general, the invention is only intended to be limited by the scope of the following claims.

The invention claimed is:

1. A roll comprising a rolled dough piece having a total amount of dough, with a first amount of dough on a first side of a central transverse plane of the roll and a second, different amount of dough on a second, opposite side of the central transverse plane such that the roll is asymmetrical and formed as an asymmetric repeat unit, wherein the first amount of dough is 42.5-47.5% of the total amount of dough and the second amount of dough is 52.5-57.5% of the total amount dough.

2. The roll of claim 1, wherein the dough piece, when in an unrolled state, includes a bottom edge, a first top edge and a second top edge, the first and second top edges being directly connected at a peak that is not centered relative to the bottom edge.

3. The roll of claim 2, wherein:
the first top edge is at a first angle relative to the bottom edge; and
the second top edge is at a second angle, which is different from the first angle, relative to the bottom edge.

4. The roll of claim 2, wherein:
the dough piece includes a first side edge, a second side edge and a transition area;
the first side edge connects the bottom edge to the first top edge;
the second side edge connects the bottom edge to the transition area;
the transition area connects the second side edge to the second top edge;
the first top edge is directly connected to the first side edge at a first point; and
the second top edge is directly connected to the transition area at a second point.

5. The roll of claim 4, wherein a distance from a first end of the bottom edge to the peak is longer than a distance from a second end of the bottom edge to the peak.

6. The roll of claim 1, wherein the dough piece, when in an unrolled state, the dough piece includes a bottom edge, two side edges directly connected to the bottom edge, and two angled top edges directly connected at a peak, with one of the two side edges being directly connected to one of the two angled top edges while another of the two side edges is only connected to another of the two angled top edges through a transition area, wherein the peak is not centered along the bottom edge.

7. The roll of claim 6, wherein the transition area extends from the another of the two side edges towards the one of the two side edges so as to be offset from the another of the two side edges.

8. The roll of claim 6, wherein the transition area includes a first edge section substantially parallel to the bottom edge and a second edge section substantially parallel to the another of the two side edges.

9. The roll of claim 6, wherein the transition area is defined by a side edge portion extending at an angle to and directly from the another of the two side edges to the another of the two angled top edges.

10. The roll of claim 6, wherein the two angled top edges extend at different angles relative to the bottom edge.

11. The roll of claim 1, further comprising a filling.

12. The roll of claim 1, wherein the roll is a crescent roll.

13. A package comprising multiple rolls, wherein each roll of the multiple rolls includes a rolled dough piece having a total amount of dough, with a first amount of dough on a first side of a central transverse plane of the roll and a second, different amount of dough on a second, opposite side of the central transverse plane such that each roll is asymmetrical and an asymmetric repeat unit, wherein the first amount of dough is 42.5-47.5% of the total amount of dough and the second amount of dough is 52.5-57.5% of the total amount dough.

14. The package of claim 13, wherein the dough piece, when in an unrolled state, includes a bottom edge, a first top edge and a second top edge, the first and second top edges being directly connected at a peak that is not centered relative to the bottom edge.

15. The package of claim 14, wherein:
the first top edge is at a first angle relative to the bottom edge; and
the second top edge is at a second angle, which is different from the first angle, relative to the bottom edge.

16. The package of claim 14, wherein:
the dough piece includes a first side edge, a second side edge and a transition area;
the first side edge connects the bottom edge to the first top edge;
the second side edge connects the bottom edge to the transition area;
the transition area connects the second side edge to the second top edge;
the first top edge is directly connected to the first side edge at a first point; and
the second top edge is directly connected to the transition area at a second point.

17. The package of claim 16, wherein a distance from a first end of the bottom edge to the peak is longer than a distance from a second end of the bottom edge to the peak.

18. The package of claim 13, wherein the dough piece, when in an unrolled state, the dough piece includes a bottom edge, two side edges directly connected to the bottom edge, and two angled top edges directly connected at a peak, with one of the two side edges being directly connected to one of the two angled top edges while another of the two side edges is only connected to another of the two angled top edges through a transition area, wherein the peak is not centered along the bottom edge.

19. The package of claim 13, further comprising a filling in each roll.

20. The package of claim 13, wherein each roll is a crescent roll.

* * * * *